(12) United States Patent
Kodama

(10) Patent No.: US 11,800,023 B2
(45) Date of Patent: Oct. 24, 2023

(54) IMAGE FORMATION DEVICE, SETTING METHOD, AND SYSTEM

(71) Applicant: SHARP KABUSHIKI KAISHA, Sakai (JP)

(72) Inventor: Hirotaka Kodama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/506,599

(22) Filed: Oct. 20, 2021

(65) Prior Publication Data

US 2022/0131985 A1 Apr. 28, 2022

(30) Foreign Application Priority Data

Oct. 27, 2020 (JP) ................. 2020-180034

(51) Int. Cl.
*H04N 1/00* (2006.01)
*H04N 1/21* (2006.01)

(52) U.S. Cl.
CPC ..... *H04N 1/00344* (2013.01); *H04N 1/00244* (2013.01); *H04N 1/21* (2013.01)

(58) Field of Classification Search
None
See application file for complete search history.

(56) References Cited

U.S. PATENT DOCUMENTS

| | | | | |
|---|---|---|---|---|
| 2008/0130051 A1* | 6/2008 | Lawrence | ............ | G06F 3/1288 358/1.15 |
| 2011/0113469 A1* | 5/2011 | Takahashi | ............ | H04L 63/306 726/1 |
| 2012/0215662 A1* | 8/2012 | Ito | ............ | H04L 63/102 705/26.61 |
| 2015/0370650 A1* | 12/2015 | Tajima | ............ | G06F 21/608 707/647 |
| 2016/0004491 A1* | 1/2016 | Amano | ............ | G06F 3/1222 358/1.14 |
| 2016/0371041 A1* | 12/2016 | Sato | ............ | G06F 3/1219 |

FOREIGN PATENT DOCUMENTS

| | | | | |
|---|---|---|---|---|
| JP | 2004171093 | * | 6/2004 | ............ G06F 3/12 |
| JP | 2004260272 | * | 9/2004 | ............ H04N 1/00 |
| JP | 2005020201 | * | 1/2005 | ............ H04N 1/00 |
| JP | 2006190170 | * | 7/2006 | ............ H04N 1/00 |
| JP | 2010108215 | * | 5/2010 | ............ G06F 3/12 |
| JP | 2010-128824 A | | 6/2010 | |
| JP | 2012011703 | * | 1/2012 | ............ G06F 3/12 |
| JP | 2014178757 | * | 9/2014 | ............ G06F 3/12 |
| JP | 2016081161 | * | 5/2016 | ............ G06F 3/12 |
| JP | 2018-200538 A | | 12/2018 | |

* cited by examiner

*Primary Examiner* — Beniyam Menberu
(74) *Attorney, Agent, or Firm* — ScienBiziP, P.C.

(57) ABSTRACT

An image formation device includes a controller, a storage, and an image former. The storage has a first storage area and a second storage area. The first storage area stores a setting value to be referred to during an operation of the image formation device. The second storage area stores management information to which a group policy is applied. The controller, when the management information was able to be acquired from an external portion, sets the setting value based on the acquired management information, and, when the management information was not able to be acquired from the external portion, sets the setting value based on the management information stored in the second storage area.

7 Claims, 6 Drawing Sheets

IMAGE FORMATION DEVICE, SETTING METHOD, AND SYSTEM

CROSS-REFERENCE TO RELATED APPLICATION

The present application claims priority from Japanese Patent Application Number 2020-180034, the content to which is hereby incorporated by reference into this application.

BACKGROUND OF THE INVENTION

Field of the Invention

The present disclosure relates to an image formation device and the like.

Description of the Related Art

A group policy is known as one of the mechanisms to collectively manage computers and devices in a network. Using the group policy can collectively manage, for example, the functional settings of an image formation device.

For example, in a system in which, for a plurality of multi-functional peripherals (MFPs) under the environment of a management server, the operation of a client is controlled by a policy defined at a server, an image formation system in which a policy for each group is applied (set) from the management server has been proposed (see, for example, Japanese Unexamined Patent Application Publication No. 2018-200538).

Also, it is described that, in a system in which a management server applies a policy for each group to a client who is under management of a management server, for preventing a user from intentionally or negligently applying a policy, which is applied to a client, to a group other than the group to which the user belongs and operating with a wrong policy, the management server sends a control policy and a policy group identifier to the client, the client who has received them stores the policy group identifier, and, when the control policy is applied from the next time onward, the client controls whether or not to apply the control policy depending on whether or not the stored policy group identifier matches (see, for example, Japanese Unexamined Patent Application Publication No. 2010-128824).

SUMMARY OF THE INVENTION

An object of the present disclosure is to provide an image formation device and the like that can apply a setting based on appropriate management information, when management information cannot be acquired.

An image formation device of the present disclosure includes: a controller; a storage; and an image former, wherein the storage has a first storage area and a second storage area, the first storage area stores a setting value to be referred to during an operation of the image formation device, the second storage area stores management information to which a group policy is applied, and the controller, when the management information was able to be acquired from an external portion, sets the setting value based on the acquired management information, and, when the management information was not able to be acquired from the external portion, sets the setting value based on the management information stored in the second storage area.

A system of the present disclosure includes: an image formation device having a first controller, a storage, and an image former; and a management server having a second controller, wherein the second controller of the management server delivers, to the image formation device, management information to which a group policy is applied, the storage of the image formation device has a first storage area and a second storage area, the first storage area stores a setting value to be referred to during an operation of the image formation device, the second storage area stores the management information delivered from the management server, and the first controller of the image formation device, when the management information was able to be acquired from the management server, sets the setting value based on the acquired management information, and, when the management information was not able to be acquired from the management server, sets the setting value based on the management information stored in the second storage area.

The image formation device according to the present disclosure can exert an excellent effect of applying an appropriate group policy in a case where the group policy cannot be acquired.

DETAILED DESCRIPTION OF THE INVENTION

Figure 1:
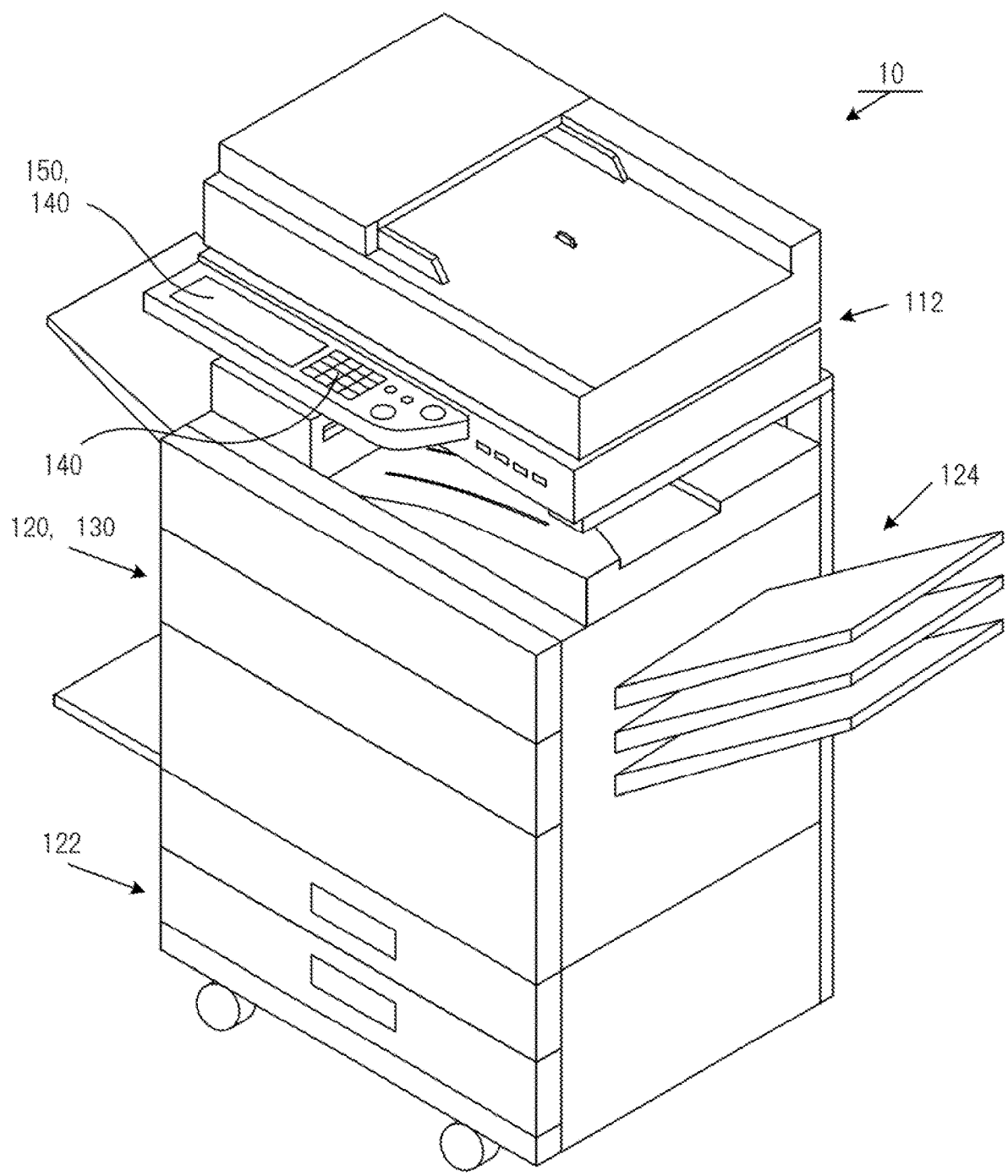
FIG. 1 is an illustration of a configuration of an image formation device according to a present embodiment.

Hereinafter, the present disclosure will be described with reference to the accompanying drawings. The following embodiment is an example for explaining an image formation device of the present disclosure, and it is of course true that the invention described in the claims is not limited to the following embodiment.

1. First Embodiment

1.1 System Overview

In general, a group policy is known as a mechanism to collectively manage a plurality of devices. For example, a management device generates a group policy object (management-directed template) that includes policies such as whether or not to change the setting of an item in each device, and the setting value or the like of the item. Then, the management device sets a terminal device (image formation device) to be linked to a group policy object, as a group policy.

That is, based on the policy set in the management device, the setting of each item is managed in the device to which the policy is applied. The information set in these policies (group policies) can be acquired by the device to which each group policy is applied.

For example, if the image formation device is placed under the management of the group policy, applying the policy to the image formation device causes the values, which are set in the policy, to be respectively reflected to the image formation device.

As an example, the following describes an operation seen when using the group policy. The management device determines a setting value that accords to the policy. The management device generates an ADMX file which is a management-directed template including the setting value. The ADMX file may include a language-independent file (*.admx) and a language-dependent file (*.adml).

By acquiring the ADMX file, each device refers to the setting values or the like included in the ADMX file, and the setting values of the corresponding setting items in each device are determined. Hereinafter, any information that includes the values of the setting items managed by the policy (setting values), such as ADMX, is referred to as management information.

The ADMX file, which is the management information, is stored in an active directory. For example, the ADMX file is stored in a shared storage location (central store) of a system volume of a domain controller. Each device receives the ADMX file from the shared storage location. The central store may be generated at any, for example, is generated at a management server 20 or at a storage device 30.

At this time, even though some settings are originally managed based on the policy, the policy may not be applied due to any intentional or negligent reason, and the settings may be collectively or individually changed. Further, when collectively importing the setting values from an external portion (when using a function that can overwrite the setting values from the external portion of the image formation device, such as a function that imports the setting values by a device cloning or the like, or a function that centrally manages a plurality of image formation devices and can perform a collective updating or the like of the setting values), there is a risk that the settings managed originally by the group policy may be overwritten.

For items managed by these policies, there is no problem if the management information is acquired again via the network with the setting change as a trigger, and the items are overwritten with the setting values included in the management information. However, if connection to the network cannot be achieved for some reason, the management information cannot be acquired. If the management information cannot be acquired, devices may be operated with settings that differ from the group policy.

That is, if, for some reason, the setting value, to which the group policy was supposed to be applied, is unintentionally rewritten and, in this state, connection is disconnected from the network, an operate will be made with the setting value different from the setting value to which the group policy was applied (setting value acquired from management information), and this was not able to be prevented.

In an environment where the functional settings of the image formation device are collectively managed by the group policy, the present disclosure overwrites with an appropriate setting value, even if someone, in some way, changes the setting that is, by the group policy, made subject to management.

1.2 Functional Configuration

First, the configuration of an image formation device 10 according to the present disclosure will be described.

As shown in FIG. 1, the image formation device 10 is an information processing device that includes a document reader 112 at an upper portion of the image formation device 10 thereby to read an image of a document, and outputs an image by an electrophotographic method.

Figure 2:
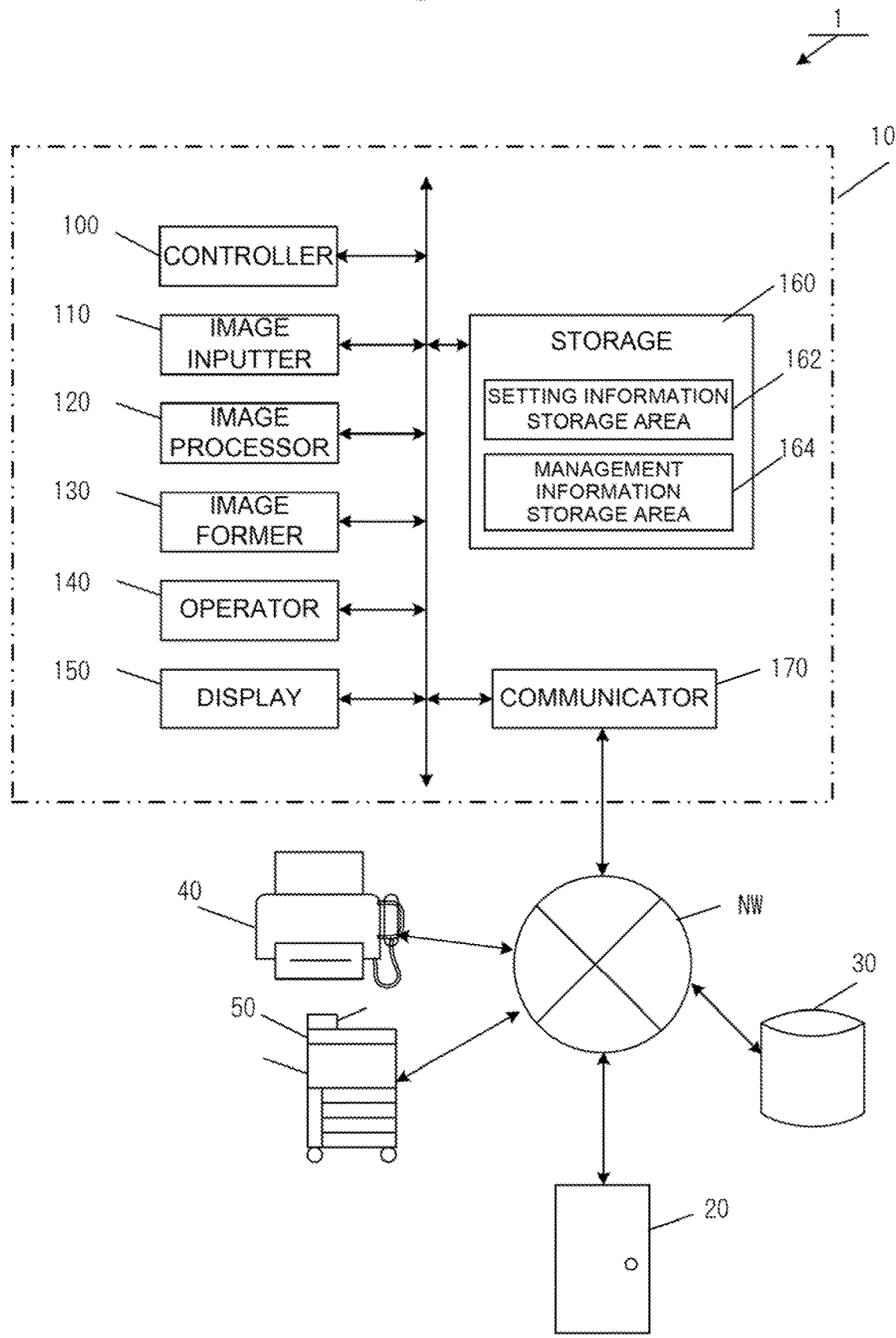
FIG. 2 is a block diagram of the image formation device according to the present embodiment.

As shown in FIG. 2, the image formation device 10 mainly includes a controller 100, an image inputter 110, the document reader 112, an image processor 120, an image former 130, an operator 140, a display 150, a storage 160, and a communicator 170.

The controller 100 is a functional unit for controlling the entirety of image formation device 10. The controller 100 realizes various functions by reading and executing various programs, and is composed of, for example, one or more arithmetic devices (e.g., a CPU (Central Processing Unit)).

The image inputter 110 is a functional unit for reading image data that is input to the image formation device 10. Then, the image inputter 110 is connected to the document reader 112, which is a functional unit for reading the image of the document, and inputs the image data output from the document reader 112.

The image inputter 110 may also input the image data from a storage medium such as a USB memory or an SD card. Further, the image data may also be input from any other terminal device, by the communicator 170 that provides connection with any other terminal device.

The document reader 112 has a function of optically reading the document placed on a contact glass (not shown) and passing scan data to the image former 130.

The image processor 120 is a functional unit for forming, on a record medium (e.g., record paper), output data which is based on the image data. For example, as shown in FIG. 1, the record paper is fed from a paper feed tray 122, and after the image is formed on the surface of the record paper in the image processor 120, the paper is discharged from a paper discharge tray 124. The image processor 120 is configured by, for example, a laser printer or the like which uses an electrophotographic method.

The image former 130 has a function to make a conversion into a set file format (TIFF, GIF, JPEG or the like), based on the image data read by the document reader 112. Then, an output image is formed based on the image data that has been processed.

The operator 140 is a functional unit for receiving an operation instruction by a user, and is composed of various key switches, a device for detecting input by contact, and the like. Via the operator 140, the user inputs any function and output condition to be used.

The display 150 is a functional unit for displaying various pieces of information to the user, and is composed, for example, of an LCD (liquid crystal display).

That is, the operator 140 provides a user interface which is for operating the image formation device 10, and the display 150 displays various setting menu screens and messages of the image formation device.

As shown in FIG. 1, the image formation device 10 may include, as a configuration of the operator 140, a touch screen in which an operation panel 141 and the display 150 are integrally formed. In this case, the method of detecting the input of the touch screen may be any general detection method, such as a resistive film method, an infrared method, an electromagnetic induction method, and a capacitance method.

The storage 160 includes, for example, a non-volatile ROM (Read Only Memory), a RAM (Random Access Memory), a HDD (Hard Disk Drive), and the like. The storage 160 may also be provided with a Solid State Drive (SSD) which is a semiconductor memory.

The storage 160 also secures an area for a setting information storage area 162 (first storage area) for storing setting information and a management information storage area 164 (second storage area) for storing the management information.

The setting information storage area 162 stores the setting information which is the setting necessary for the operation of the image formation device 10. The setting information includes, for example, each of settings that are referred to during the operation of the image formation device 10, such as a network setting, a copy/fax setting, and a scan destination setting. The setting information includes setting that can be originally changed by an administrator only and the setting that can be changed by the user also.

The management information storage area 164 stores the management information received by the image formation device 10 via the communicator 170. The management information is, for example, the ADMX file which is the management-directed template in the group policy, and includes settings of the network (for example, gateway address settings). In general, the settings (items) included in the management information are settings (items) managed by the group policy, and it is preferable that the user cannot change the settings by the image formation device 10.

Here, the management information storage area 164 is preferably an independent area (secure area) and an area which cannot be rewritten from the external portion. For example, in order to store the information in the management information storage area 164, the controller 100 cannot execute writing without going through a predetermined program or a predetermined device. Further, the management information storage area 164 is normally a hidden area, and generally may be an invisible (unrecognizable from a general program) area.

Further, the management information storage area 164 may be stored in a storage device other than the storage 160. The data stored in the management information storage area 164 may be hidden except in a special way or in a special program.

That is, the management information is stored in the management information storage area 164 only when the controller 100 applies the group policy. That is, it is limited to when the controller 100 receives the management information via the communicator 170. Accordingly, as described above, even when the user collectively overwrites the settings by the device cloning, the setting information in the setting information storage area 162 is overwritten, but the management information in the management information storage area 164 is not overwritten.

The communicator 170 provides a communication connection with an external device. A communication interface (communication I/F) used for sending and receiving data is provided as the communicator 170. With the communication I/F, the user's operation at the image formation device 10 allows data, which is stored in the storage of the image formation device 10, to be sent to and received from any other computer device connected via a network NW.

Further, FIG. 2 discloses a system 1 as an overall system configuration. The system 1 includes the image formation device 10, the management server 20, the storage device 30, a fax 40, and a multi-functional peripheral 50. Although the image formation device 10, the fax 40, and the multi-functional peripheral 50 are expressed differently, a so-called multi-functional peripheral can be composed of the same device or the same type of device.

As shown in FIG. 2, the image formation device 10 (a multi-functional machine MFP as an example) can be connected with the management server 20 via the network NW. Further, other devices (e.g., FAX 40, multi-functional peripheral 50) are connected to the network NW. For example, the image formation device 10, the fax 40, and the multi-functional peripheral 50 are under the management of the group policy.

Further, the management information for applying the group policy (such as an ADMX file that is a management-directed template) may be stored in the storage device 30. The management information is stored and managed by the active directory in the system. That is, the management server 20 may store the management information, and the so-called central store in the system may store the management information. In this way, the management information is to be stored in a location where the image formation device 10 can acquire the management information via the network NW.

Change of Group Policy Settings

Figure 3A:
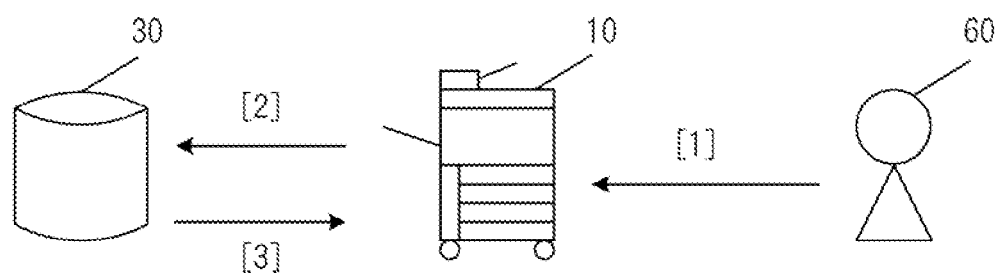
FIG. 3A and FIG. 3B are explanatory illustrations of a group policy management process in the image formation device according to the present embodiment.
Figure 3B:
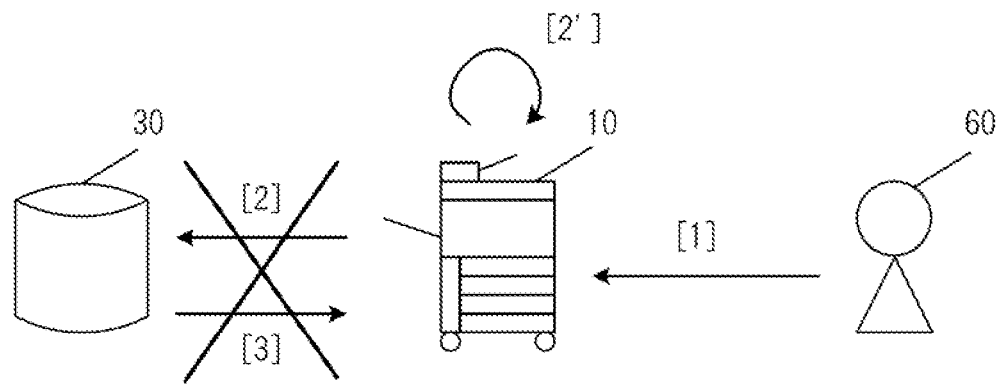

FIG. 3A and FIG. 3B are overview diagrams describing a case where the setting values of the group policy are changed.

In the image formation device 10 shown in FIG. 2, a setting value is stored in the setting information storage area 162, and the image formation device 10 operates based on the setting value. For example, the image former 130 of the image formation device 10 forms the image based on the stored setting value. In a state where the group policy is applied by the management server, as shown in FIG. 3A, when any person such as a user 60 changes the setting value (setting value stored in the setting information storage area 162)[1], as necessary, the management information reflecting the group policy is acquired from the storage device 30 via the network NW[2][3], and the management information is stored in the management information storage area 164.

According to the setting included in the acquired management information, the image formation device 10 overwrites the setting value stored in the setting information storage area 162 with the setting value included in the management information.

On the other hand, when the network NW is blocked for some reason, the management information to which the group policy is applied cannot be acquired from the storage device 30 through the network NW, as shown in FIG. 3B. In that case, even if the setting value stored in the setting information storage area 162 is intentionally or negligently overwritten with another setting value, the setting value cannot be overwritten based on correct management information.

Then, in the present embodiment, the image formation device 10 overwrites the setting value of the setting information storage area 162 with the setting value included in the management information which was stored when the image formation device 10 acquired the management information to which the group policy is applied [2'].

Example of Group Policy

Hereinafter, an example of the items managed as the group policy will be described. In principle, the setting items managed as the group policy cannot be changed on the user side (e.g., the image formation device 10, or a printer driver in the computer).

For example, the settings may include the followings.

(1) Matters Related to Setting of Image Formation Device

For example, the settings of the image formation device 10 (e.g., an IP address of own machine, a gateway address, information of mail server, applied security level or the like, as the settings of the network, the paper size of the paper feed tray, user information or the like, clock information of the device) and the like are conceivable.

For example, the "gateway address" is set to "192.168.11.1" in the group policy, and the management information includes information to that effect. In this case, even if being changed by the user, the gateway address can be restored to the correct setting value at the timing when the management information is applied.

Further, in the first place, it may be so made that the user cannot change the setting values for settings that are managed by the group policy. For example, the image formation device 10 may prevent the user from changing any value, with respect to the setting included in the management information. Further, the management information may also include information (flag) on whether or not the user can make a change.

(2) Matters Related to Function of Image Formation Device

For example, in the image formation device 10, the setting in each function is conceivable. For example, of the functions of the image formation device 10, in the case of copy function, the group policy manages the following settings.

Duplex printing ON/OFF
Staple ON/OFF
Color automatic/Color/Monochrome

In this case, the value of each setting is managed as the group policy. For example, in the case of the above settings, if the management information includes duplex printing "ON", staple "OFF", and color "monochrome", an arrangement is possible in which the user, in the image formation device, cannot select any other setting for these settings.

1.3 Process Flow

Next, the process flow of the present embodiment will be explained with reference to FIG. 4. First, the controller 100 acquires the management information via the communicator 170 (step S102). The management information is information that includes the setting values which are set in the management server 20 and which are based on the group policy. The management information is, for example, a management-directed template file such as the ADMX file in the system of group policies as described above. For example, the image formation device 10 acquires the management-directed template file, which is administrative information, from the central store in the active directory.

Upon acquiring the management information, the controller 100, based on the setting value included in the management information, updates the setting value to which the image formation device 10 refers (step S104). That is, the setting (setting value) stored in the setting information storage area 162 is updated based on the setting value included in the management information. At this time, the controller 100 may assume that the setting included in the management information cannot be changed by the user or the like.

In the management information storage area 164, the controller 100 stores the management information received in step S102 (step S106). Here, the management information storage area 164 is the secure area as described above, for example, preferably the area that cannot be directly rewritten from the external portion. That is, it is preferable that the management information cannot be stored in the image formation device except in step S106.

Then, the controller 100 determines whether or not it is the timing to acquire the management information (step S108). The timing for acquiring the management information may be, for example, every predetermined time (e.g., every hour or every two hours) or at startup. The controller 100 may determine, based on a signal from the management server 20, that it is time to acquire the management information.

Next, the controller 100 determines whether or not the management information can be acquired (step S110). Here, the controller 100 determines, as follows, whether or not the management information can be acquired.

(1) Whether or not communication with the external device is possible via the communicator 170. For example, when any communication through the network is not possible, the controller 100 determines that the management information cannot be acquired. When communication cannot be executed, there are conceivable cases such as a case where non-connection to the network cannot be detected, a case where communication with a particular server cannot be established, a case where an address cannot be acquired, a case where an error has occurred in the communicator 170, and the like.

(2) Whether or not the communicator 170 can acquire the management information. For example, when communication is possible via the network but the management information cannot be received, or when the management information can be acquired but is not in a correct state, the controller 100 determines that the management information cannot be acquired.

Here, the controller 100 repeats the process from step S102 if the management information can be acquired (step S110; Yes→step S102).

On the other hand, if the management information cannot be acquired, the controller 100 reads the management information stored in the management information storage area 164 (step S112). Here, based on the stored management information, the controller 100 updates the setting value stored in the setting information storage area 162 (step S114).

Here, for updating the setting value, the controller 100 may update all of the setting values, or only the setting value that has been changed.

Then, when the timing has become such that the management information can be acquired again, new management information is acquired via the communicator 170 (step S114→step S108; Yes→step S110; Yes→step S102).

In this way, according to the present embodiment, when the image formation device 10 is managed by the group policy object, an appropriate setting to which the policy is applied is to be executed. Even if the management information cannot be acquired, the image formation device 10 will be operated, with the appropriate policy applied, based on the previously acquired management information.

Further, at the timing of receiving the new management information, the controller 100 updates the management information stored in the management information storage area 164. This makes it possible for the image formation device 10 to maintain the setting of the image formation device 10 based on the most recent management information.

2. Second Embodiment

Next, a second embodiment will be described. The second embodiment describes an operational example seen when all settings have been overwritten by the device cloning or the like.

Figure 4:
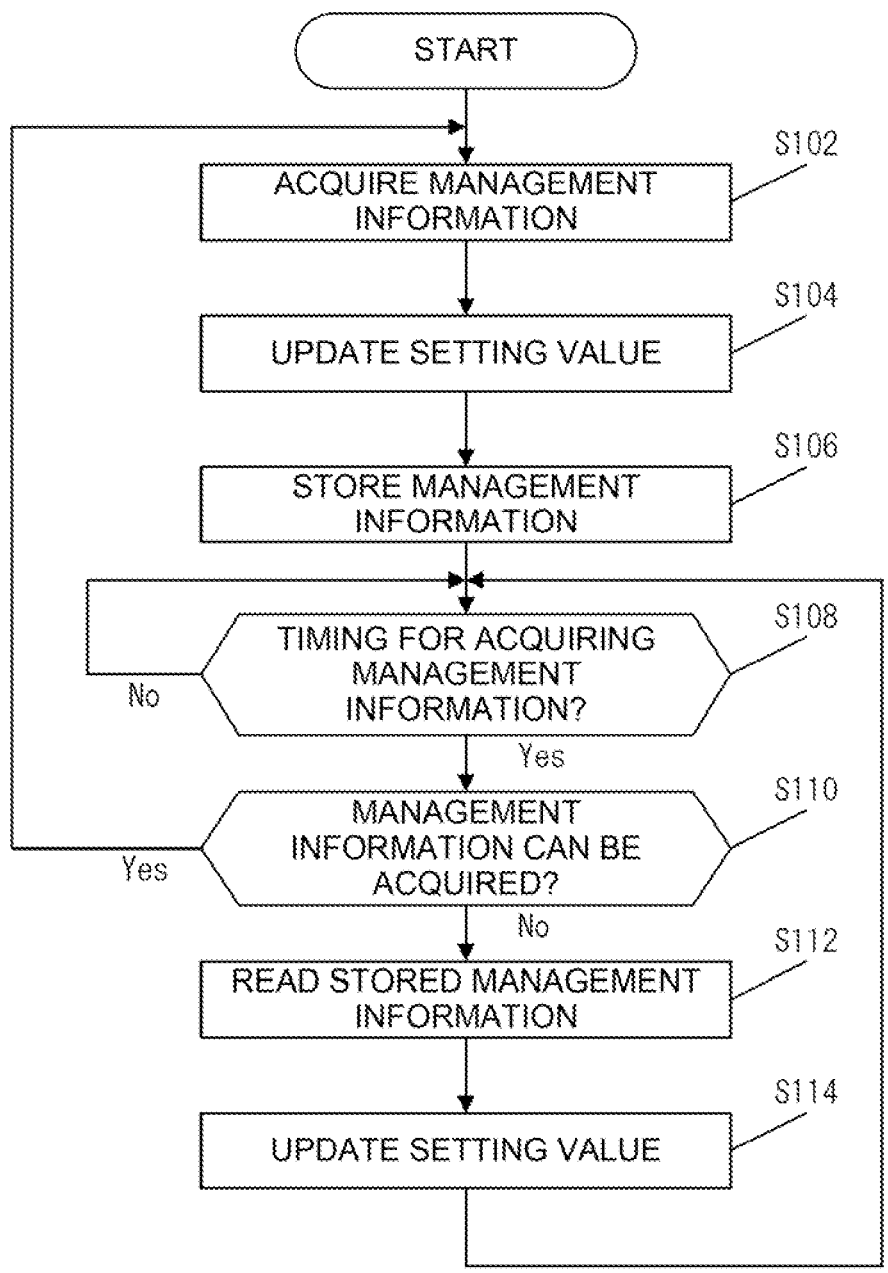
FIG. 4 is a flowchart of a first embodiment according to the present embodiment.
Figure 5:
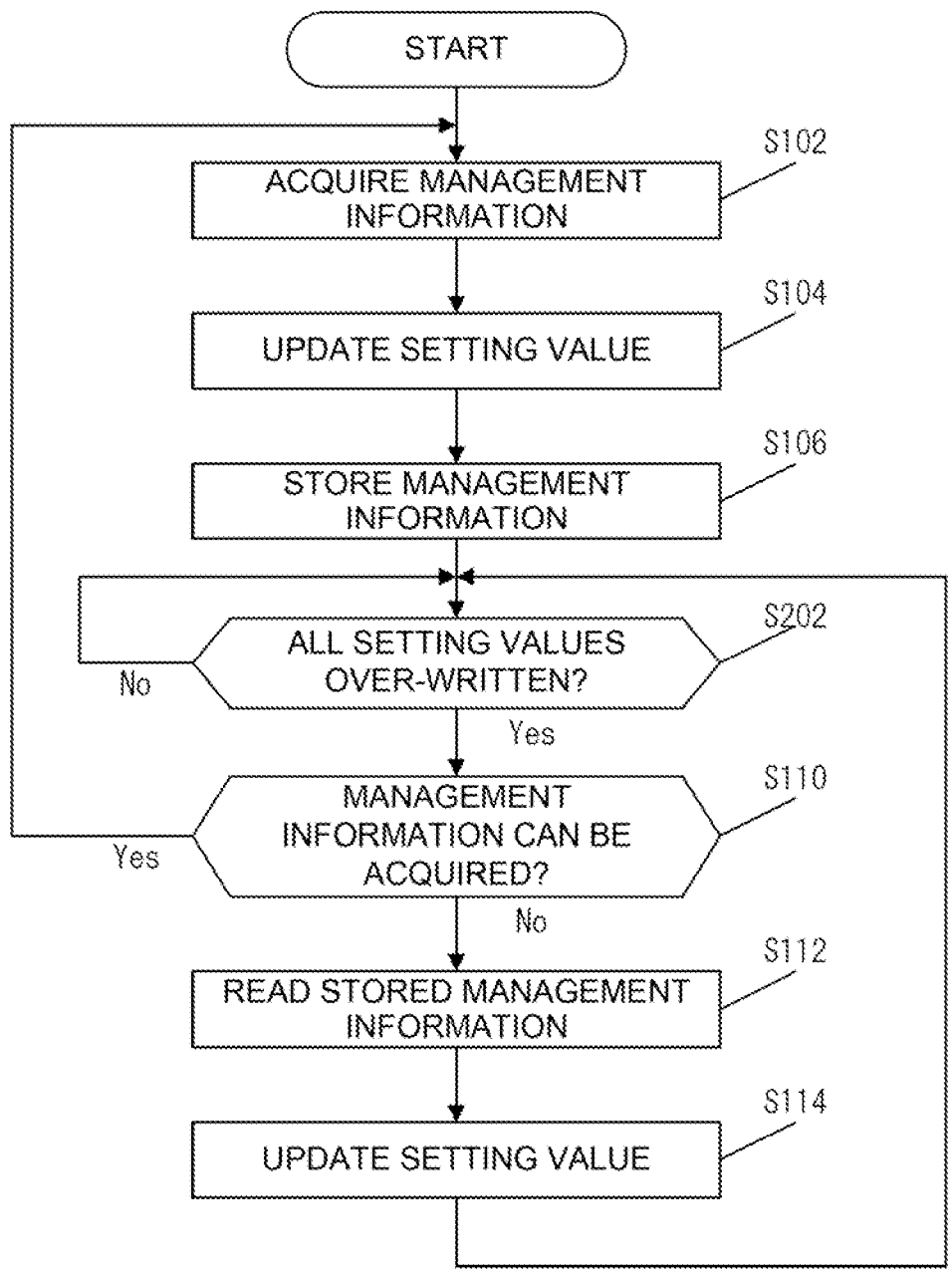
FIG. 5 is a flowchart of a second embodiment according to the present embodiment.

The present embodiment replace the process flow in FIG. 4 of the first embodiment with FIG. 5. According to the present embodiment, the description focuses on the points that differ from those of the first embodiment, and any other points are the same as in the first embodiment.

As shown in FIG. 5, a configuration where step S108 in FIG. 4 is replaced with step S202. Here, the controller 100 determines whether or not all the setting values have been overwritten from the external portion (step S202). The controller 100 acquires the management information with an operation to overwrite the data from the external portion having been executed as a trigger (step S202; Yes→step S110).

As for the operation to overwrite the data from the external portion, assumed cases include that an external device is connected and the setting values are rewritten all together by using the device cloning or the like, that the setting is rewritten by processing an import, or that the setting value is rewritten by a remote connection. When the above operations should be performed, the controller 100 acquires the management information assuming that the setting value has been overwritten. Then, the setting that should be originally managed by the group policy object is updated to the value set by the group policy object.

In this way, according to the present embodiment, even if the setting value that is not changed by simply operating the original image formation device 10 is accidentally updated or is maliciously updated, the setting managed by the group policy object can be changed to the setting which accords to the policy.

3. Third Embodiment

Next, a third embodiment will be described. The third embodiment describes an operational example seen when the actual setting value is different even though the setting value in the image formation device 10 is managed by the group policy.

Figure 6:
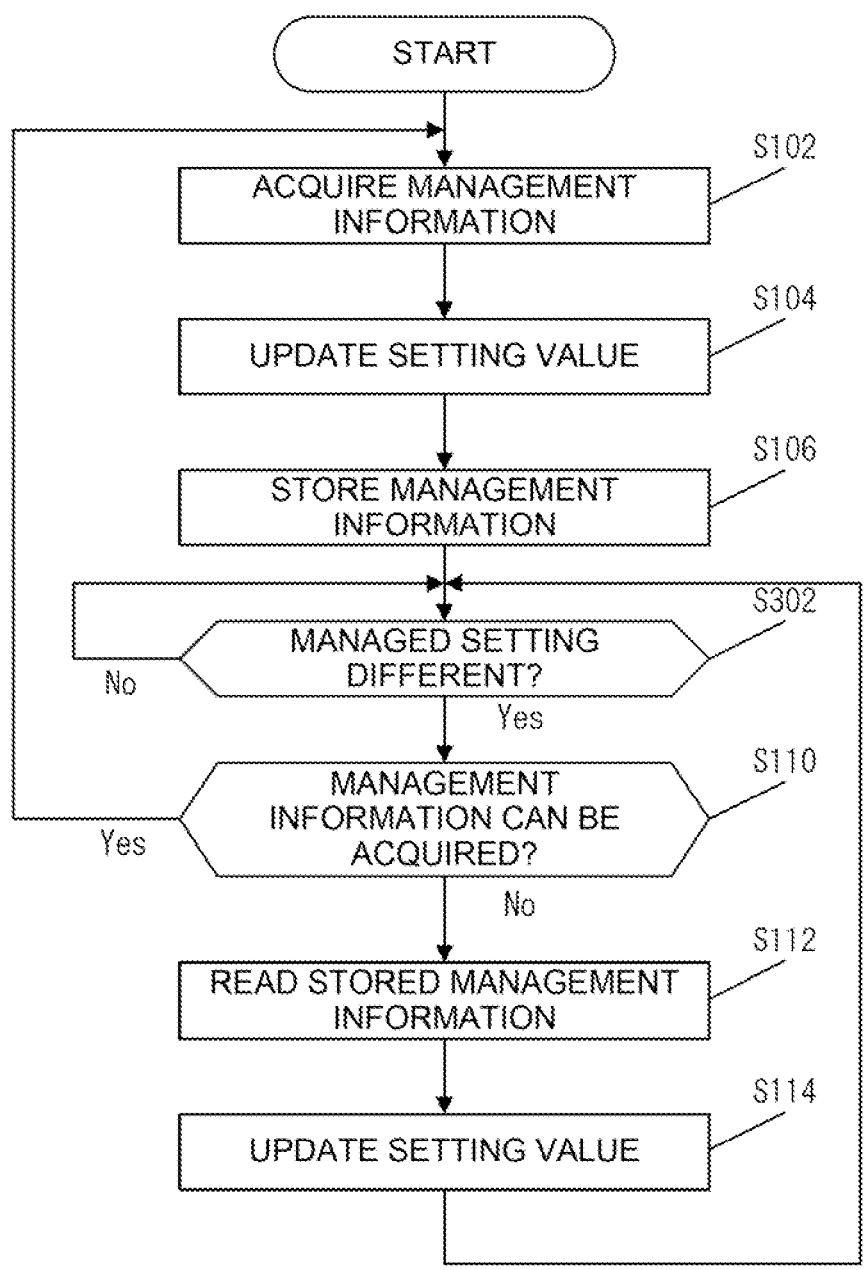
FIG. 6 is a flowchart of a third embodiment according to the present embodiment.

The present embodiment replaces the process flow in FIG. 4 of the first embodiment with FIG. 6. According to the present embodiment, the description focuses on the points that differ from those of the first embodiment, and any other points are the same as in the first embodiment.

As shown in FIG. 6, step S108 in FIG. 4 is replaced with step S302. Here, the controller 100 determines whether the managed setting is different (step S302).

Here, though determination of whether the managed setting is different or not is variously conceivable, the controller 100 makes the determination, for example, in the following method.

(1) When the setting value is updated, the fact that any change has been made is owned as a flag. The controller 100 refers to the flag thereby to determine whether or not any change has been made.

(2) The currently set setting value is compared with the setting value of the management information stored in the management information storage area 164, thereby to determine whether or not the setting value has been changed.

(3) A check digit of the setting value is owned. Then, referring to the value of the check digit determines whether or not any change is made.

In this way, according to the present embodiment, even if the setting value that is not changed by simply operating the original image formation device 10 is accidentally updated or is maliciously updated, the setting managed by the group policy object can be changed to the setting which accords to the policy.

In the image formation device 10, even if the setting is managed in the group policy object, the above is effective when the user can change the setting or when the setting has been changed due to a malfunction of the image formation device 10 (when having become changeable).

4. Fourth Embodiment

Next, a fourth embodiment will be described. Although the embodiments described above are for group policy objects, they can be applied to any other management system.

For example, as the management information, the management information file is generated by the user having an administrative authority in the management system. Then, each device connected to the management system stores the location where the management information file is located. Each device acquires the management information file from a location (e.g., server, directory, or the like) where the management information is available.

That is, even if the active directory mechanism is not used, the above embodiment is applicable to any system in which, by using a management information file, the setting values are managed in a similar manner.

5. Fifth Embodiment

Next, a fifth embodiment will be described. The fifth embodiment is, in addition to the embodiments described above, an embodiment in which the image formation device 10 is transitioned to a restricted state when the management information stored in the management information storage area 164 is old.

For example, if the management information cannot be acquired, the controller 100 reads the stored management information (step S112 in FIG. 4). Here, when the management information is old, the controller 100 may transition the state of the image formation device 10 to the restricted state.

For example, if a predetermined period of time has elapsed since the management information was stored in the management information storage area 164, the controller 100 determines that the management information is not valid, and transitions the image formation device 10 to the restricted state. For example, if one day has elapsed or three days have elapsed since the management information was stored, the image formation device may be brought into the restricted state.

Further, the controller 100 may make the determination based on the number of times. For example, when the controller 100 reads five times the management information from the management information storage area 164, the image formation device 10 may be brought into the restricted state until the new management information is acquired.

The restricted state of the image formation device 10 is a state where the operation of the image formation device is restricted. For example, the controller 100 may stop the operation of the entire device, or may not execute a predetermined function (e.g., not execute the copy function). Further, the controller 100 may not perform a particular function. For example, when the transition is made to the restricted state, the controller 100 may not perform a color printing.

6. Variation

The embodiments of the invention have been described in detail with reference to the drawings, but the specific configuration is not limited to the present embodiments, and designs or the like to the extent that they do not depart from the gist of the invention are also included in the scope of the claims.

Further, the program that operates in each device in the embodiment is a program that controls the CPU or the like so as to realize the functions of the embodiments described above (a program that makes a computer function). The information handled by these devices is temporarily stored in a temporary storage device (e.g., RAM) during the process thereof, and then stored in various storage devices such as ROM, HDD, and SSD, where, as necessary, the information is read, modified, and written by the CPU.

In the case of distribution to the market, the program can be stored in a portable record medium and distributed, or transferred to a server computer connected via a network such as the Internet. In this case, the storage device of the server computer is of course also included in the present invention.

Further, although having described the managed device as the image formation device, the above embodiments are of course applicable to any other device as well. For example, the above embodiments can be applied to any information processing device such as computer, and any other devices such as home appliance and a television.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image formation device, comprising: a controller; a storage; and an image former,
    wherein the storage has a first storage area and a second storage area,
        the first storage area stores one or more setting values to be referred to during an operation of the image formation device, and
        the second storage area stores management information to which a group policy is applied, and
    the controller,
        when the management information was able to be acquired from an external portion, sets a setting value based on the acquired management information, and
        when the management information was not able to be acquired from the external portion, sets the setting value based on the management information stored in the second storage area, and upon determining that the management information stored in the second storage area has been read a predetermined number of times, brings the image formation device into a restricted state where an operation of the image formation device is restricted.

2. The image formation device according to claim 1, wherein the controller acquires the management information from the external portion at predetermined time intervals.

3. The image formation device according to claim 1, wherein the controller acquires the management information when a setting value, among the one or more setting values stored at least in the first storage area, that corresponds to the setting value, that is set based on the management information is updated.

4. The image formation device according to claim 1, wherein when, by a device cloning, any of the one or more setting values stored in the first storage area is updated, and the management information was not able to be acquired from the external portion, the controller further sets the setting value based on the management information stored in the second storage area.

5. The image formation device according to claim 1, wherein the second storage area is a secure storage area which is not writable by the external portion.

6. A system, comprising: an image formation device having a first controller, a storage, and an image former; and
    a management server having a second controller,
    wherein the second controller of the management server delivers, to the image formation device, management information to which a group policy is applied,
    the storage of the image formation device has a first storage area and a second storage area,
    the first storage area stores a setting value to be referred to during an operation of the image formation device,
    the second storage area stores the management information delivered from the management server, and
    the first controller of the image formation device,
        when the management information was able to be acquired from the management server, sets the setting value based on the acquired management information, and
        when the management information was not able to be acquired from the management server, sets the setting value based on the management information stored in the second storage area, and upon determining that the management information stored in the second storage area has been read a predetermined number of times, brings the image formation device into a restricted state where an operation of the image formation device is restricted.

7. A method that sets one or more setting values in an image formation device including a storage having a first storage area that stores the setting value to be referred to during an operation of the image formation device and a second storage area that stores management information to which a group policy is applied and that is a secure storage area which is not writable by an external portion, the method comprising:
    when the management information was able to be acquired from the external portion, setting a setting value based on the acquired management information;
    when the management information was not able to be acquired from the external portion, setting the setting value based on the management information stored in the second storage area; and upon determining that the management information stored in the second storage area has been read a predetermined number of times, bringing the image formation device into a restricted state where an operation of the image formation device is restricted.

* * * * *